Sept. 4, 1923.                                              1,467,043
J. R. C. KEARNS
MEANS FOR INDICATING AND MEASURING THE TRAVEL OF MOVING PARTS OF
MACHINE TOOLS
Filed Aug. 15, 1922                3 Sheets-Sheet 3

INVENTOR:
Joseph R. C. Kearns
By Wm Wallace White
ATTY.

Patented Sept. 4, 1923.

1,467,043

UNITED STATES PATENT OFFICE.

JOSEPH RICHARD CARDEN KEARNS, OF BROADHEATH, NEAR MANCHESTER, ENGLAND, ASSIGNOR OF ONE-HALF TO H. W. KEARNS AND COMPANY LIMITED, OF BROADHEATH, NEAR MANCHESTER, ENGLAND, A BRITISH COMPANY.

MEANS FOR INDICATING AND MEASURING THE TRAVEL OF MOVING PARTS OF MACHINE TOOLS.

Application filed August 15, 1922. Serial No. 582,042.

*To all whom it may concern:*

Be it known that I, JOSEPH RICHARD CARDEN KEARNS, subject of the King of Great Britain, residing at Broadheath, near Manchester, in the county of Lancaster, England, have invented new and useful Improvements in Means for Indicating and Measuring the Travel of Moving Parts of Machine Tools, of which the following is a specification.

This invention relates to means for indicating and measuring the travel of moving parts of machine tools, such as the displacement of headstocks, outer supports and work tables or carriages of such tools.

In the case of a horizontal boring machine the invention enables accurately and quickly to adjust into the same horizontal plane the rotary axes of the headstock and outer support.

The invention consists in the provision of a dial with a pointer or pointers, such dial moving with and operated by the displacement of the moving part of the machine tool, indicating the position thereof relatively to a zero position.

For example a dial is carried by the headstock, outer support or work table or carriage. Pointers moving over this dial indicate in inches and fractions of an inch the displacement of the part from its zero position, by means of rotary motion obtained by the travel of a rotating nut formed as a gear wheel, displaced with the part along a stationary non-rotating screw.

In the case of the horizontal boring machine above mentioned, such a dial and mechanism being provided on both the headstock and the outer support for the boring bar, the rotary axes of these two parts can easily be adjusted into the same horizontal plane by displacing either or both parts until their dials give corresponding readings of elevation from a common initial level.

A constructional embodiment of the invention showing same applied to the headstock, carriage and outer support of a combined surfacing, boring, milling and drilling machine, is illustrated on the accompanying drawings, in which:—

Fig. 1 is a side elevation of the machine, Fig. 2 an outline end elevation of the headstock end of the machine, and Fig. 3 a plan of sufficient of the headstock end of the machine to illustrate the application of the invention thereto.

On a larger scale:—

Figure 7:
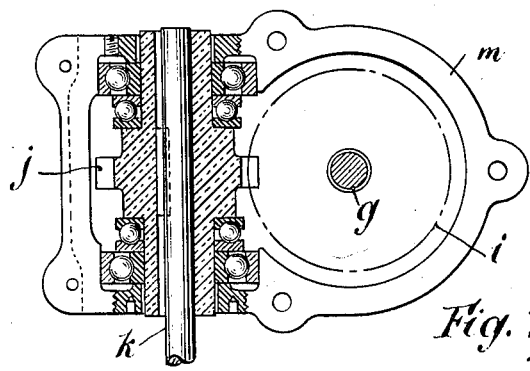

Fig. 7 a horizontal section of the driving nut mechanism.

$a$ is the headstock of a combined surfacing, boring, milling and drilling machine, of which $b$ is the work table or carriage and $c$ the outer support for the boring bar.

The headstock $a$ slides vertically along a column $d$, the work table $b$ slides horizontally along a bed $e$, and the outer support $c$ slides vertically along a column $f$.

Figure 2:
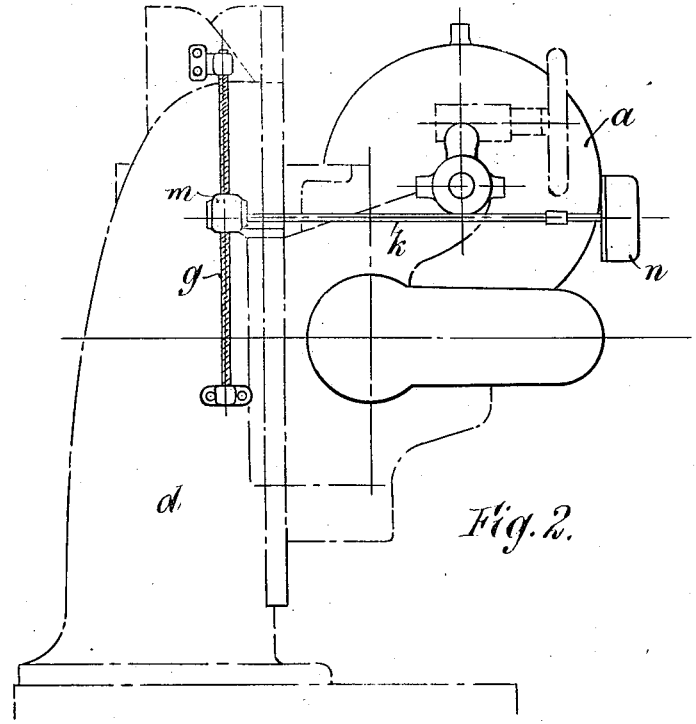
Figure 3:
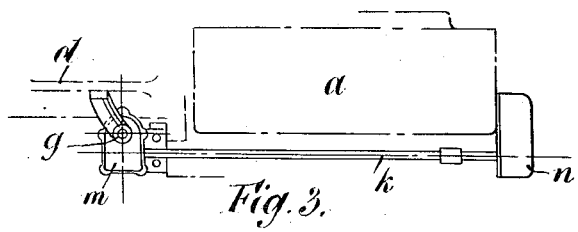
Figure 6:
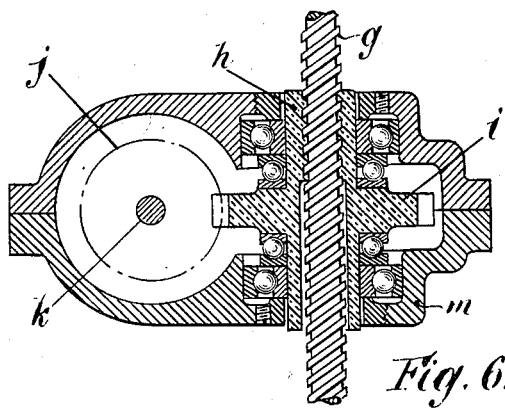
Fig. 6 is a vertical section.

Secured along the column $d$, Fig. 2, is a non-rotating screw $g$. On this screw $g$ is threaded a nut $h$, Figs. 6 and 7, which is formed externally with a skew spur wheel $i$. The skew wheel $i$ gears with a second skew wheel $j$, keyed on a horizontal spindle $k$.

The nut $h$ and the skew wheels $i$, $j$ are mounted on ball bearings in a casing $m$ carried with the spindle $k$ by the headstock $a$.

The casing $m$ participates in the vertical displacements of the headstock $a$ and during same the nut $h$ is consequently displaced along the non-rotating screw $g$, which causes rotation of the nut $h$ and thereby of the wheels $i$, $j$ and spindle $k$.

Figure 5:
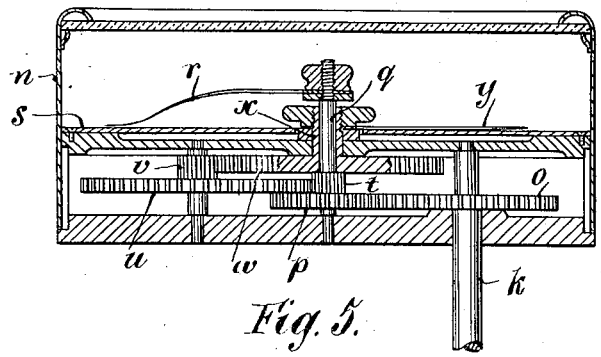
Fig. 5 is a horizontal section through the dial casing showing gearing actuating the pointers thereof.
Figure 4:
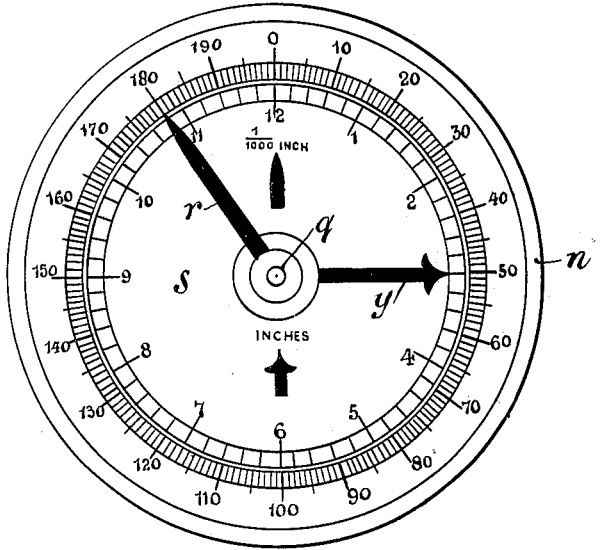
Fig. 4 is a front elevation of the dial.

The spindle $k$ extends to the front of the machine where it enters and actuates the pointer mechanism of a dial casing $n$. Within the casing $n$ the spindle $k$ has fast thereon a spur wheel $o$ (Fig. 5), which gears with a spur wheel $p$ fast on a spindle $q$, bearing a pointer $r$ moving over a dial $s$. The mechanism is so calibrated that this pointer $r$ indicates on the dial $s$ movements of the headstock $a$ of $\frac{1}{1000}$ inch.

A pinion $t$ is also fast on the spindle $q$ and drives a spur wheel $u$ fast with a pinion $v$, which in turn drives a spur wheel $w$ fast on a sleeve $x$ rotating coaxially on the spindle $q$. The whole constitutes a reducing train like the cannon pinion, minute wheel and pinion and hour wheel of a clock.

The sleeve $x$ has fast hereto a second pointer $y$ indicating on the dials displacements of the headstock $a$ of $\frac{1}{5}$ inch upwards.

Figure 1:
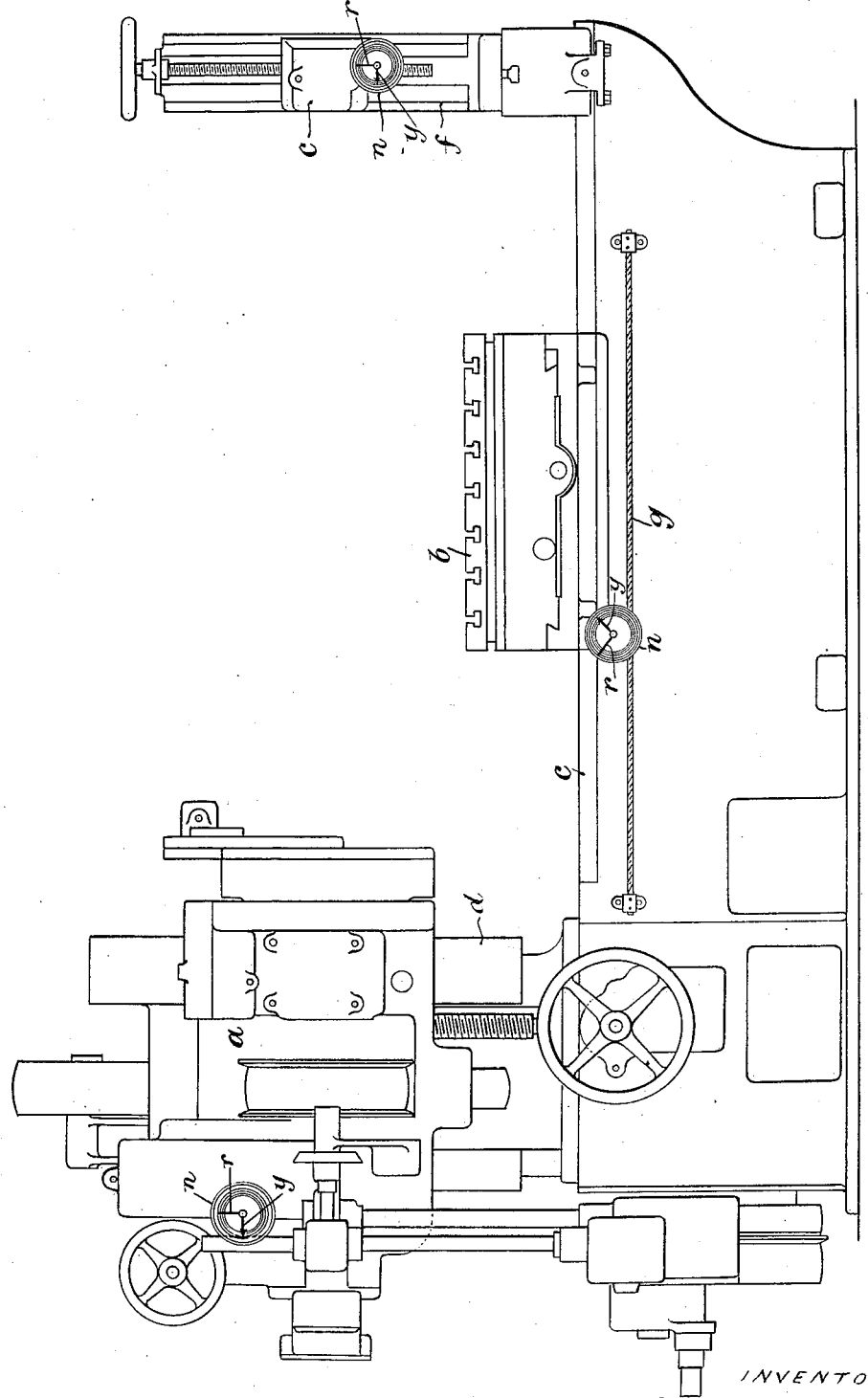

As can be seen in Fig. 1, similar measuring mechanism is applied to the work table $b$ and outer support $c$, corresponding parts shown being correspondingly lettered.

I claim:

1. In a machine tool, a displaceable part, a stationary screw spindle mounted parallel to the path of said displaceable part, a nut on said displaceable part threaded on said screw spindle, a skew wheel on said nut, a second skew wheel gearing with said first-mentioned skew wheel, a spindle rotated by said second-mentioned skew wheel, a dial on said displaceable part, and a pointer rotated by said skew wheel-rotated spindle moving over said dial.

2. In a machine tool, a displaceable part, a stationary screw spindle mounted parallel to the path of said displaceable part, a nut on said displaceable part threaded on said screw spindle, a spindle rotated by said nut, a dial on said displaceable part, a pointer rotated by said nut-rotated spindle moving over said dial, and a second pointer rotated by said nut-rotated spindle moving over said dial at a lesser rate than said first-mentioned pointer.

3. In a machine tool, a displaceable part, a stationary screw spindle mounted parallel to the path of said displaceable part, a nut on said displaceable part threaded on said screw spindle, a skew wheel on said nut, a second skew wheel gearing with said first-mentioned skew wheel, a spindle rotated by said second-mentioned skew wheel, a dial on said displaceable part, a pointer rotated by said skew wheel-rotated spindle moving over said dial, and a second pointer rotated by said skew wheel-rotated spindle moving over said dial at a lesser rate than said first-mentioned pointer.

In testimony whereof I have signed my name to this specification.

JOSEPH RICHARD CARDEN KEARNS.